(12) United States Patent
Fujimoto

(10) Patent No.: US 9,734,444 B2
(45) Date of Patent: Aug. 15, 2017

(54) SOLID-STATE BARCODES AND METHODS FOR THEIR PREPARATION AND USE

(71) Applicant: Empire Technology Development LLC, Wilmington (DE)

(72) Inventor: Koji Fujimoto, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/732,424

(22) Filed: Jun. 5, 2015

(65) Prior Publication Data
US 2016/0358056 A1 Dec. 8, 2016

(51) Int. Cl.
| | |
|---|---|
| *G02B 26/00* | (2006.01) |
| *G06K 19/06* | (2006.01) |
| *G06K 7/12* | (2006.01) |
| *G06K 7/10* | (2006.01) |
| *B29C 47/00* | (2006.01) |
| *B29C 47/06* | (2006.01) |
| *B29K 77/00* | (2006.01) |
| *B29K 67/00* | (2006.01) |
| *B29K 29/00* | (2006.01) |
| *B29L 17/00* | (2006.01) |

(52) U.S. Cl.
CPC .... *G06K 19/06028* (2013.01); *B29C 47/0014* (2013.01); *B29C 47/062* (2013.01); *B29C 47/065* (2013.01); *G06K 7/10722* (2013.01); *G06K 7/12* (2013.01); *G06K 19/0614* (2013.01); *G06K 19/06037* (2013.01); *B29K 2029/04* (2013.01); *B29K 2067/003* (2013.01); *B29K 2067/046* (2013.01); *B29K 2077/00* (2013.01); *B29K 2995/0021* (2013.01); *B29L 2017/00* (2013.01)

(58) Field of Classification Search
CPC . G06K 7/12; G06K 7/1404; G06K 2019/0625
See application file for complete search history.

(56) References Cited

U.S. PATENT DOCUMENTS

| | | | |
|---|---|---|---|
| 4,476,149 A * | 10/1984 | Poppe | G01N 33/521 101/223 |
| 6,017,496 A * | 1/2000 | Nova | B01J 19/0046 422/107 |
| 7,028,911 B2 | 4/2006 | Cheung et al. | |

(Continued)

OTHER PUBLICATIONS

"Battery Assisted Passive RFID Technology Brings Low Cost Smart Temperature Monitoring to Cold Chain," accessed at http://web.archive.org/web/20131109183554/http://www.prweb.com/releases/2013/5/prweb10680215.htm, May 1, 2013, pp. 1-2.

(Continued)

*Primary Examiner* — Daniel St Cyr
(74) *Attorney, Agent, or Firm* — Dorsey & Whitney LLP

(57) ABSTRACT

Solid-state barcodes, paints containing the solid-state barcodes, and methods of manufacturing the paint are disclosed. The solid-state barcode may include a core portion and a shell portion substantially surrounding the core portion. One or both of the core portion and the shell portion may include a pattern of two or more regions, the pattern configured to encode information. Such solid-state barcodes can be attached at arbitrary positions on objects by applying the paint containing the barcode onto the objects.

27 Claims, 4 Drawing Sheets

(56) References Cited

U.S. PATENT DOCUMENTS

| | | | |
|---|---|---|---|
| 7,851,338 B2 | 12/2010 | Alivisatos et al. | |
| 2005/0042764 A1* | 2/2005 | Sailor | G01N 21/31 436/166 |
| 2006/0040286 A1* | 2/2006 | Mirkin | C12Q 1/6816 435/6.11 |
| 2006/0086528 A1* | 4/2006 | Clare | G06K 19/06018 174/122 G |
| 2009/0109435 A1* | 4/2009 | Kahen | C09K 11/025 356/317 |
| 2011/0236260 A1 | 9/2011 | Kim et al. | |

OTHER PUBLICATIONS

"Resene PaintTrack is a chemical barcode addd to Resene paints and coatings," accessed at http://web.archive.org/web/20131109183554/http://resene.co.nz/comn/whtsnew/PaintTrack.htm, accessed on Sep. 5, 2014, p. 1-1.

"Thermassure RF Evidencia's Wireless RFID Temperature Sensor," accessed at http://web.archive.org/web/20140827125820/http://evidencia.biz/products/thermassurerf.htm, accessed on Sep. 5, 2014, pp. 1-2.

Finkel, N. H., et al., "Barcoding the Microworld," Analytical Chemistry, vol. 76, No. 19, pp. 352A-359A (Oct. 1, 2004).

O'Dwyer, C., et al., "Low-dimensional, hinged bar-code metal oxide layers and freestanding, ordered organic nanostructures from turbostraticvanadium oxide," Small, vol. 4, No. 7, pp. 990-1000 (Jul. 2008).

Simbrunner, C., et al., "Color Tuning of Nanofibers by Periodic Organic-Organic Hetero-Epitaxy," ACS Nano, vol. 6, No. 6, pp. 4629-4638 (May 17, 2012).

Swedberg, C., "DHL Thermonet Tracks Drugs and Life-Sciences Goods With RFID Temperature Tag," accessed at http://web.archive.org/web/20140825111740/http://www.rfidjournal.com/articles/view?10777, accessed on Sep. 5, 2014, pp. 1-2.

Zhao, Y., et al., "Multifunctional photonic crystal barcodes from microfluidics," NPG Asia Materials, vol. 4, No. e25, pp. 1-7 (2012).

\* cited by examiner

SOLID-STATE BARCODES AND METHODS FOR THEIR PREPARATION AND USE

BACKGROUND

Information management tools such as barcodes and/or QR codes have been used for managing large quantities of articles. Usually, such codes are printed on the packaging instead of on the articles themselves. In other words, no information regarding the article, such as origin or product description, remains with the article after the packaging is removed.

There is a growing demand for providing barcodes and/or QR codes on the articles themselves rather than on their packaging, or on tags attached to the articles. The packaging and tags can be easily separated from the articles resulting in loss of information during handling of the articles. For example, for material recycling and traceability efforts, it is important that information regarding the article permanently follows the article and not dissociate from the article during the article's lifetime. Printing methods such as ink jet printing have been used to print barcodes directly onto components. However, ink jet printing have limitations in that the system installation is complex, the ink may bleed on the printing surface, and the printing quality is compromised on uneven surfaces. Laser printing have also been used to print barcodes on objects. However, laser printing requires the printing surface to withstand high temperatures during the printing, which is not suitable for all types of materials.

There is, therefore, a need for new information encoded codes (for example, barcodes and QR codes) and methods of attaching such codes directly onto articles.

SUMMARY

In some embodiments, a solid-state barcode includes a core portion and a shell portion substantially surrounding the core portion. One or both of the core portion and the shell portion may include a pattern of two or more regions. The pattern can be configured to encode information.

In some embodiments, a paint includes at least one optically transparent binder and at least one solid-state barcode dispersed in the optically transparent binder. The solid-state barcode may include a core portion and a shell portion substantially surrounding the core portion. One or both of the core portion and the shell portion may include a pattern of two or more regions. The pattern can be configured to encode information.

In some embodiments, a labeled object includes a paint covering at least a portion of an object. The paint may include at least one optically transparent binder and at least one solid-state barcode dispersed in the optically transparent binder. The solid-state barcode may include a core portion and a shell portion substantially surrounding the core portion. One or both of the core portion and the shell portion may include a pattern of two or more regions. The pattern can be configured to encode information.

In some embodiments, a method of manufacturing one or more solid-state barcodes includes extruding at least one core resin solution and at least one shell resin solution to form one or more core-shell fibers. The core-shell fiber may include a core portion and a shell portion substantially surrounding the core portion. One or both of the core portion and the shell portion may include a pattern of two or more regions. The pattern can be configured to encode information.

In some embodiments, a method of manufacturing a paint includes extruding at least one core resin solution and at least one shell resin solution to form at least one core-shell fiber, and dispersing the at least one core-shell fiber in at least one optically transparent binder to form the paint. The core-shell fiber may include a core portion and a shell portion substantially surrounding the core portion. One or both of the core portion and the shell portion may include a pattern of two or more regions. The pattern can be configured to encode information.

In some embodiments, a method of labeling an object includes providing a paint that includes at least one optically transparent binder and at least one solid-state barcode dispersed in the optically transparent binder, and applying the paint on a surface of the object. The solid-state barcode may include a core portion and a shell portion substantially surrounding the core portion. One or both of the core portion and the shell portion may include a pattern of two or more regions. The pattern can be configured to encode information.

In some embodiments, a method of reading information encoded in one or more solid-state bar codes includes providing a scanner configured to generate at least one optical signal, and interrogating the one or more solid-state barcodes with the at least one optical signal. Each solid-state barcode may include a core portion and a shell portion substantially surrounding the core portion. One or both of the core portion and the shell portion may include a pattern of two or more regions. The pattern can be configured to encode information. The method of reading information may further include acquiring an image of the pattern from the optical signal that is reflected from the one or more solid-state barcodes, and decoding the information that is encoded in the pattern using an image processing software.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
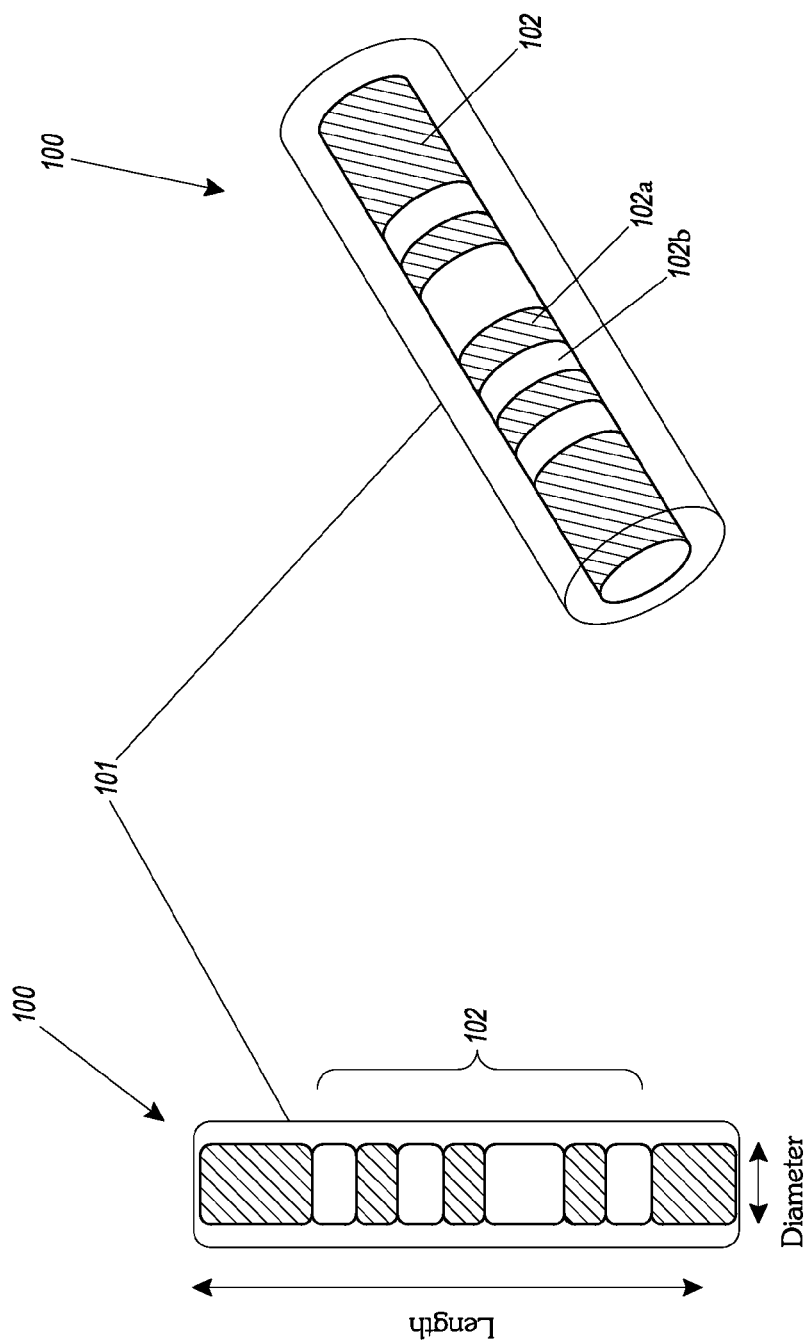
FIG. 1 illustrates a solid-state barcode having repeated patterns of colored regions along a core portion, and a protective shell portion surrounding the core portion in accordance with some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Solid-state barcodes, paints containing solid-state barcodes, methods of manufacturing solid-state barcodes and paints, and methods of using solid-state barcodes, are disclosed herein.

In some embodiments, a solid-state barcode includes a core portion and a shell portion substantially surrounding the core portion. One or both of the core portion and the shell portion may include a pattern of two or more regions. The pattern can be configured to encode information, such as information relating to an object labeled by the barcode. Examples of such information include origin of the object, material composition, date of manufacture, expiration date, carbon footprint information, operating conditions or parameters, and so on. In some embodiments, the solid-state barcode has a three dimensional shape. The solid-state barcode can have any shape, including but are not limited to rod-like shape, spherical shape, rectangular shape, square shape, or other shapes.

The pattern of two or more regions which encodes the information may be present in the core portion, the shell portion, or both the core portion and the shell portion. In some embodiments, the core portion includes the pattern of two or more regions. In some embodiments, the shell portion includes the pattern of two or more regions. In some embodiments, the core portion and the shell portion include different patterns of two or more regions.

The solid-state barcodes can be incorporated into paints, which can form films or coatings containing the solid-state barcodes when applied onto objects. Therefore, encoded information can be incorporated onto the objects (goods or products themselves) by applying the paints onto surfaces of the objects.

The diameter and length of the solid-state barcode can be of any size that allows the barcode to be dispersed in the paint. The diameter and length of the solid-state barcode can also be dependent on the mode of application of the paint. For example, for paints that are configured for spray coating, the solid-state barcode can be of sizes that allow it to pass through a spray nozzle. The diameter and length of the solid-state barcode can be in the micrometer range or in the nanometer range. In some embodiments, the solid-state barcode has a diameter equal to or less than about 10 micrometers. For example, the diameter of the solid-state barcode can be about 10 micrometers, about 8 micrometers, about 6 micrometers, about 4 micrometers, about 2 micrometers, about 1 micrometer, about 0.5 micrometers, about 0.1 micrometers, or a diameter between any of these values. In some embodiments, the solid-state barcode has a diameter equal to or less than about 1 micrometer. In some embodiments, the solid-state barcode has a length equal to or less than about 100 micrometers. For example, the length of the solid-state barcode can be about 100 micrometers, about 80 micrometers, about 60 micrometers, about 40 micrometers, about 20 micrometers, about 10 micrometers, about 1 micrometers, or a length between any of these values. In some embodiments, the solid-state barcode has a length equal to or less than about 10 micrometers. The pattern of regions on the core portion and/or the shell portion (which encodes information) can be configured to be less visible or not visible to the naked eye of a person for purposes such as for added security. In some embodiments, the size of the at least one region in the pattern on the core portion and/or the shell portion can be small enough so that the pattern cannot be seen by the naked eye.

The term "color" as used herein is not limited to colors from the visible spectrum and may also refer to colors from other segments of the electromagnetic spectrum, including infra-red spectrum and ultra-violet spectrum. In some embodiments, the pattern of two or more regions have colors in the visible light spectrum, infra-red spectrum, ultra-violet spectrum, or any combination thereof. In some embodiments, at least two regions in the pattern are different in color. In some embodiments, the pattern of two or more regions in the core portion have colors in the visible light spectrum. In some embodiments, the pattern of two or more regions in the shell portion have colors in the infra-red spectrum, ultra-violet spectrum, or both. In some embodiments, the pattern of two or more regions in the core portion have colors in the visible light spectrum, and the pattern of two or more regions in the shell portion have colors in the infra-red spectrum, ultra-violet spectrum, or both. By configuring the pattern on the shell portion with colors that are from different segments of the electromagnetic spectrum from the core portion, interference between the pattern on the core portion and the pattern on the shell portion when reading the solid-state barcodes can be avoided as the two patterns can be interrogated with different wavelengths of optical signals.

The shell portion is generally optically transparent to wavelengths of light or optical signals that can interrogate the core portion of the solid state barcode. In some embodiments, the shell portion is optically transparent to light in the visible spectrum. The shell portion can protect the core portion from damage caused by external factors such as moisture, impact during handling, and so on. The shell portion can also maintain the different regions of the core portion in the pattern that encodes the information, so that the pattern does not change over time.

In some embodiments, the core portion, the shell portion, or both, includes at least one organic resin material. In some embodiments, the at least one organic resin material includes polyamide resin, polyester, polyvinyl alcohol, polyethylene oxide, polyvinylidene fluoride, or any combination thereof. In some embodiments, the polyamide is Nylon 6, Nylon 66, Nylon 11, Nylon 12, Nylon MXD6, or any combination thereof. In some embodiments, the polyester is polyethylene terephthalate, polylactic acid, or a mixture of both. Organic resin materials are generally easy to be colored and are easy to be shaped into three dimensional shapes, thereby making the materials suitable for both the core portion and the shell portion of the solid state barcode. In some embodiments, the core portion and the shell portion include different organic resin materials. For example, if the core portion is made of a polyamide such as Nylon 6, the shell portion is made of a polyester such as polyethylene terephthalate.

The organic resin material can be colored using colorants such as pigments and dyes. In some embodiments, the core portion, the shell portion, or both, further include at least one colorant having a color in the visible light spectrum. In some embodiments, the core portion further includes at least one colorant having a color in the visible light spectrum. The colorant can be an acidic dye. The acidic dye can be azo dye, anthrachinon dye, pyrazolone dye, phthalocyanine dye, xanthene dye, indigoid dye, triphenylmethane dye, or any combination thereof. The organic resin can also be colored using colorants having colors in the non-visible spectrum. In some embodiments, the core portion, the shell portion, or both, further include at least one marker having a characteristic absorption band in the infra-red spectrum, the ultra-violet spectrum or both. In some embodiments, the shell portion further includes at least one marker having a characteristic absorption band in the infra-red spectrum, the ultra-violet spectrum or both. The at least one marker can include infra-red (IR) marker, ultra-violet (UV) marker, or a mixture of both. The IR marker can be an aldehyde, a ketone, an acid anhydride, a quantum dot, or any combination thereof. The UV-marker can be corn oil, beta-carotene, bis(2-ethylhexyl)adipate, diethylhexyl phthalate, dimethyl phthalate, quantum dot, or any combination thereof.

FIG. 1 shows an exemplary solid-state barcode 100. The solid-state barcode 100 can be a length of fiber having a core-shell structure. The core-shell structure may have a core portion 102 and a shell portion 101 surrounding the core portion 102. The core portion 102 may include two or more regions which form a pattern that can encode information. For example, by providing core resin materials of two different colors, such as white and black, the pattern formed by black regions 102a and white regions 102b along the core portion 102 can be configured to encode information. The shell portion 101 that surrounds the core portion 102 can protect the core portion 102 from damage. Although not shown in FIG. 1, the shell portion can also be configured with regions of different colors, such as regions with IR markers and/or regions with UV markers, which form a pattern that can encode information.

Figure 4:
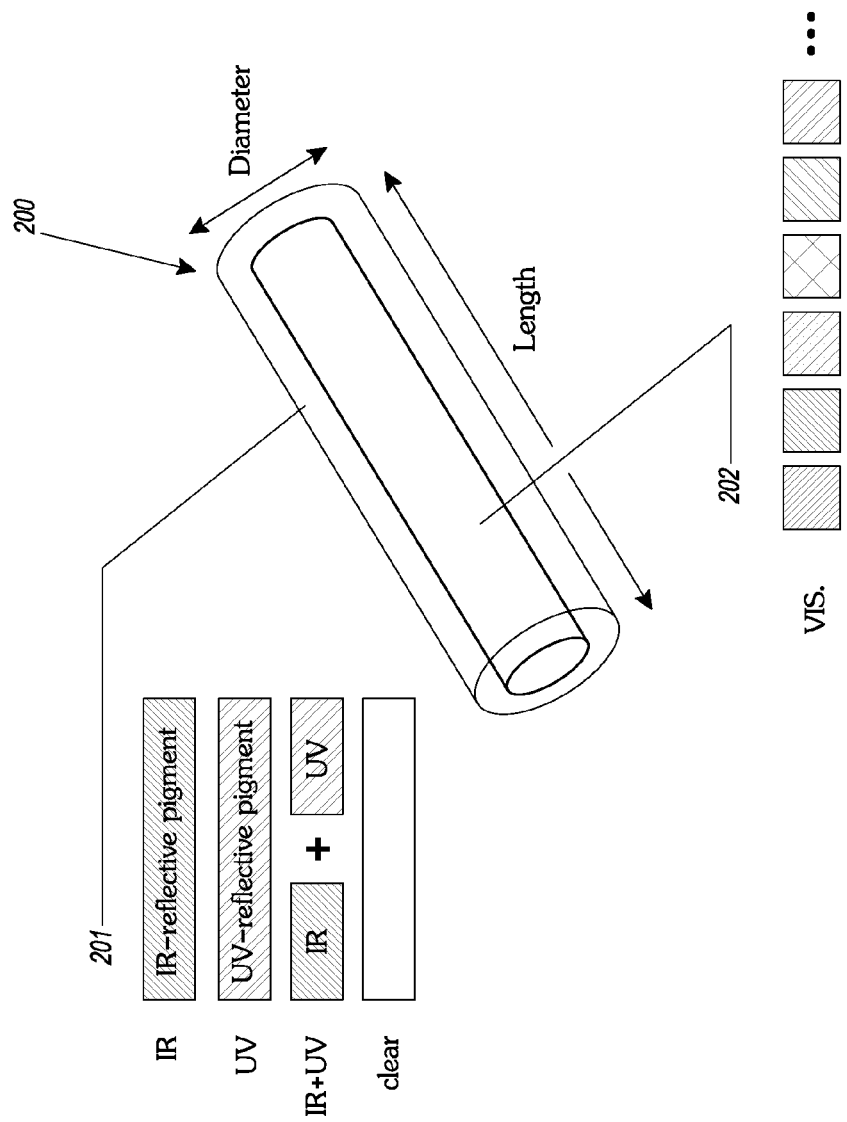
FIG. 4 illustrates a solid-state barcode having repeated patterns of colored regions along a core portion, and markers in a shell portion, in accordance with some embodiments.

FIG. 4 shows another example of a solid-state barcode 200. The solid-state barcode 200 can be a length of core-shell fiber having a core portion 202 and a shell portion 201 surrounding the core portion 202. The core portion 202 may include two or more regions which form a pattern that can encode information. For example, by providing core resin materials of two or more different colors from the visible spectrum, such as red, blue, green and/or other colors, the pattern formed by the different colored regions along the core portion 202 can be configured to encode information. The different colored regions of the core portion can be formed with resins that include different colored pigments or dyes. The shell portion 201 that surrounds the core portion 102 can include two or more regions of colors from the IR spectrum and/or the UV spectrum. The different colored regions of the shell portion can be formed with resins that include different IR markers and/or UV markers. Another alternative arrangement may include only the shell portion having the information encoded patterned regions, that is, the core portion can be a single colored portion surrounded by a shell portion having regions of different colors from the visible light spectrum, IR spectrum and/or the UV spectrum.

One or more solid-state barcodes can be incorporated into binders to form paints. In some embodiments, a paint includes at least one optically transparent binder, and at least one solid-state barcode dispersed in the optically transparent binder. The solid-state barcode may include a core portion and a shell portion substantially surrounding the core portion. One or both of the core portion and the shell portion may include a pattern of two or more regions. The pattern can be configured to encode information. Suitable solid-state barcodes include those as described above.

The optically transparent binder may be any resin material that can form films or coatings when applied onto a surface. In some embodiments, the at least one optically transparent binder includes organic resin, water-soluble resin, thermo-setting resin, UV-curing resin, or any combination thereof. The optically transparent binder can allow optical signals that interrogate the solid state barcodes to pass through coatings or films formed by the paint to access the solid state barcodes. In some embodiments, the optically transparent binder is transparent to light in the visible light spectrum, infra-red spectrum, ultra-violet spectrum, or any combination thereof.

The paint can be applied onto an object to label the object with information encoded by the pattern in the solid-state barcode. The paint can be applied to the object by one or more various methods. In some embodiments, the paint is configured to be applied by brushing, spraying, dipping or a combination thereof. As the barcodes can be of sizes in the micrometer or nanometer range, only a small amount of paint is required to label the object. Also, the barcodes can be applied to very small objects such as objects having sizes in the millimeter and micrometer ranges. The paints can also prevent the barcodes from dissociating (or reduce the likelihood of the dissociating) from the object during the lifetime of the object thus preventing the loss of information relating to the object (or reducing the likelihood of the loss of information). The paint can also be easily applied onto smooth and uneven surfaces, unlike inkjet printing which has difficulties in producing good quality barcodes on uneven surfaces. As the information encoded pattern are incorporated into the barcodes dispersed in the paint, bleeding of the painted surface is unlikely an issue as compared to printing methods in which the printed ink may bleed on the object surface. The application of the paint can be carried out at room temperatures or slightly elevated temperatures which makes the paint suitable for application on a wide variety of materials such as metals, plastics and so on.

Objects may be labelled with one or more solid state barcodes by applying paints containing the barcodes to the objects. In some embodiments, a labeled object includes a paint covering at least a portion of an object. The paint may include at least one optically transparent binder, and at least one solid-state barcode dispersed in the optically transparent binder. One or both of the core portion and the shell portion may include a pattern of two or more regions. The pattern can be configured to encode information. Suitable solid-state barcodes, binders and paints, include those as described above. Examples of objects include electronic components, plastic items, metal items, wood items, and packaged items (for example, packaged foods and packaged pharmaceuticals).

In some embodiments, a method of labeling the object includes providing a paint that includes at least one optically transparent binder and at least one solid-state barcode dispersed in the optically transparent binder, and applying the paint on a surface of the object. The solid-state barcode may include a core portion and a shell portion substantially surrounding the core portion. One or both of the core portion and the shell portion may include a pattern of two or more regions. The pattern can be configured to encode information. Suitable solid-state barcodes, binders and paints, include those as described above.

The information encoded in the solid state barcode can be read by interrogating with optical signals. In some embodiments, a method of reading information encoded in one or more solid-state bar codes includes providing a scanner configured to generate at least one optical signal, interrogating the one or more solid-state barcodes with the at least one optical signal, acquiring an image of the pattern from the optical signal that is reflected from the one or more solid-state barcodes, and decoding the information using an image processing software. In some embodiments, the optical signal has a wavelength in the visible light spectrum, infrared (IR) spectrum, ultra-violet (UV) spectrum, or any combination thereof. Suitable solid-state barcodes include those as described above. The acquiring of the image of the pattern can be performed using a detector, such as a complementary metal oxide semiconductor (CMOS) sensor, a charge-coupled device (CCD), or other detectors capable of detecting properties of light from one or more segments of the electromagnetic spectrum.

A layer of film or coating containing the solid-state barcodes may be provided on an object. The solid-state barcodes in the layer may be uniformly aligned, or may be randomly aligned. The solid-state barcodes can be read by means of, for example, optical detection in the visible light spectrum using a scanner. The scanner can acquire images of the patterns of different colored regions on the core portions and/or shell portions of the solid-state barcodes. The image processing software can then decode information by conducting image analysis of the images acquired by the scanner. The coded information can be read and decoded using generally available visual pattern analyzers.

Figure 2:
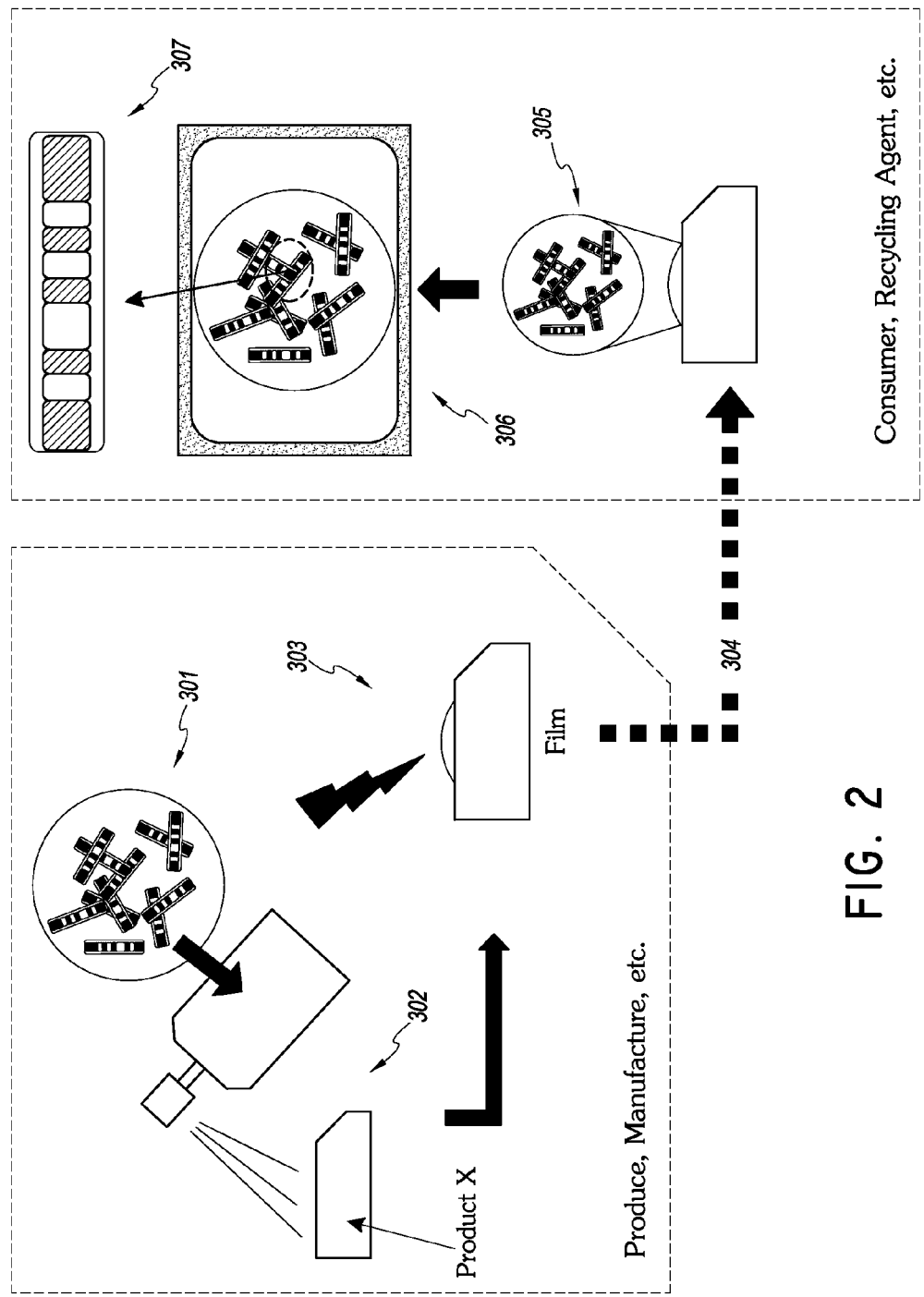
FIG. 2 illustrates an exemplary process flow for tagging products using the solid-state barcodes in accordance with some embodiments.

FIG. 2 shows an exemplary process flow for tagging objects using the solid-state barcodes in accordance with some embodiments. Referring to FIG. 2, a paint 301 containing the solid-state barcodes 305 is sprayed on an object 302. The paint is formed into a film 303 by drying, heating, UV irradiation, or other methods, depending on the type of binder(s) used in the paint. The object containing the solid-state barcodes 305 can be distributed or circulated for various applications or uses 304 during its service life. A consumer or recycling agent can read the solid-state barcodes 305 with a scanner 306, which can acquire images of the patterns 307 of different regions on the core portions and/or shell portions of the solid-state barcodes 305. The acquired images can then be analyzed by image processing software to decode information encoded in the patterns 307.

The solid state barcodes can be made by extrusion based methods. In some embodiments, a method of manufacturing one or more solid-state barcodes includes extruding at least one core resin solution and at least one shell resin solution to form one or more core-shell fibers. The core-shell fiber may include a core portion and a shell portion substantially surrounding the core portion. One or both of the core portion and the shell portion may include a pattern of two or more regions. The pattern can be configured to encode information.

In some embodiments, the at least one core resin solution includes two or more resin solutions, and the two or more core resin solutions are extruded in a predetermined order to generate the pattern of two or more regions on the core portion. In some embodiments, the at least one shell resin solution includes two or more shell resin solutions, and the two or more shell resin solutions are extruded in a predetermined order to generate a pattern of two or more regions on the shell portion.

The core-shell fiber that is extruded can be a single barcode segment that forms one solid state barcode, or can include a plurality of barcode segments that form a plurality of solid state barcodes. Where the core-shell fiber includes a plurality of barcode segments, there can be repeated patterns of the two or more regions such that when the core-shell fiber is segmented, each segment includes at least one of the patterns. Accordingly, in some embodiments, the pattern (for example, the pattern on the core portion and the pattern on the shell portion) is repeated along the length of the core-shell fiber. In further embodiments, the method of manufacturing one or more solid-state barcodes further includes separating the core-shell fiber into a plurality of barcode segments, each segment including at least one pattern.

The extruding of the at least one core resin solution and the at least one shell resin solution can be performed with any extruder capable of extruding resin solutions into fibers with core-shell configuration. In some embodiments, the extruding step includes extruding through a double syringe nozzle.

In some embodiments, the core resin solution, the shell resin solution, or both include at least one organic resin material. In some embodiments, the at least one organic resin material include polyamide, polyester, polyvinyl alcohol, polyethylene oxide, polyvinylidene fluoride, or any combination thereof. In some embodiments, the polyamide is Nylon 6, Nylon 66, Nylon 11, Nylon 12, Nylon MXD6, or any combination thereof. In some embodiments, the polyester is polyethylene terephthalate, polylactic acid, or a mixture of both. In some embodiments, the core resin solution, the shell resin solution, or both, further include at least one colorant having a color in the visible light spectrum. In some embodiments, the core resin solution further includes at least one colorant having a color in the visible light spectrum. The colorant can be an acidic dye. The acidic dye can be azo dye, anthrachinon dye, pyrazolone dye, phthalocyanine dye, xanthene dye, indigoid dye, triphenylmethane dye, or any combination thereof. In some embodiments, the core resin solution, the shell resin solution, or both, further include at least one marker having a characteristic absorption band in the infra-red spectrum, the ultra-violet spectrum or both. In some embodiments, the shell resin solution further includes at least one marker having a characteristic absorption band in the infra-red spectrum, the ultra-violet spectrum or both. The at least one marker can include infra-red (IR) marker, ultra-violet (UV) marker, or a mixture of both. The IR marker can be an aldehyde, a ketone, an acid anhydride, a quantum dot, or any combination thereof. The UV marker can be corn oil, beta-carotene, bis(2-ethylhexyl)adipate, diethylhexyl phthalate, dimethyl phthalate, quantum dot, or any combination thereof. In some embodiments, the shell resin solution is optically transparent to light in the visible light spectrum.

It is possible to achieve uniform coloration by using dyes that interact directly with organic resin molecular chains. For example, a polyamide resin can form the core portion, and acidic dyes of different colors can be applied to different regions along the core portion to uniformly color each of the different regions. To form the patterned regions along the core portion, colorants such as dyes or pigments may be used to color the different regions. The organic resin materials used for the shell portion can be transparent to visible light or other wavelengths of light that can interrogate the core portion of the solid state barcode. The organic resin materials used for the shell portion can also exhibit adhesion to resins used for the core portion.

In some embodiments, the method of manufacturing one or more solid-state barcodes further includes encoding information in the pattern of two or more regions. The encoding of the information can be performed by symbology encoding methods known in the art.

The solid state barcodes can be incorporated into a binder to form a paint. In some embodiments, a method of manufacturing a paint includes dispersing the at least one core-shell fiber in at least one optically transparent binder to form the paint. Suitable methods of forming the core-shell fiber include those as described above.

The extruding of the at least one core resin solution and the at least one shell resin solution can be performed by an electrospinning process, which can produce core-shell fibers having small diameters. In some embodiments, the extruding of the at least one core resin solution and the at least one shell resin solution includes extruding by electrospinning through the double-syringe nozzle. With this method, single seamless core-shell fibers with diameters of sub-micron order or less can be produced. In some embodiments, the core-shell fibers have an average diameter equal to or less than about 10 micrometers, or equal to or less than diameters as described above for the solid-state barcode.

Figure 3:
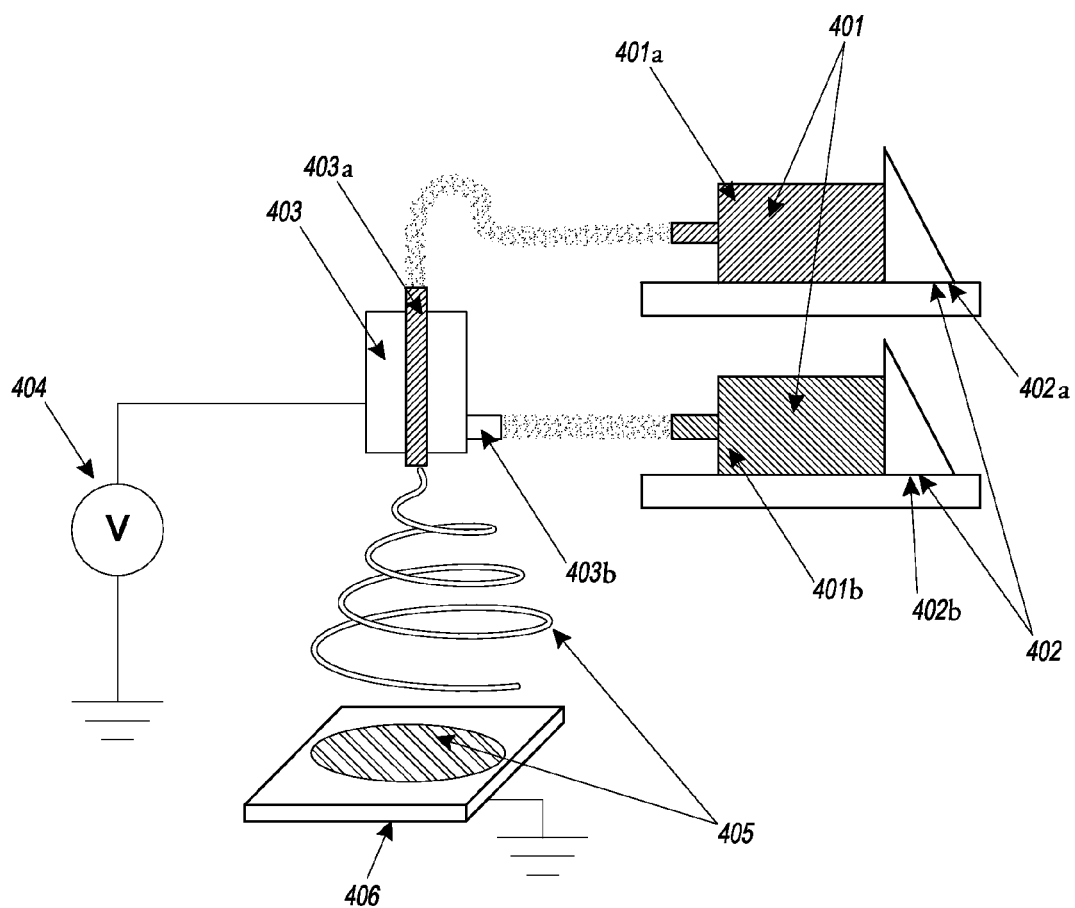
FIG. 3 illustrates an apparatus for extruding core-shell fibers in accordance with some embodiments.

Referring to FIG. 3, polymer fibers having a core-shell structure can be fabricated by using a double-syringe nozzle 403 to extrude at least one shell resin solution and at least one core resin solution to form a core-shell polymer fiber. By suitably supplying alternate flows of two or more colored core resin solutions, it is possible to form a core-shell polymer fiber 405 containing an information-presenting pattern along the core portion, such as a barcode pattern. Likewise, information encoding patterns along the shell portion can also be produced in a similar manner. Each of the two or more core colored resin solutions (core resin solution and/or shell resin solution) can be extruded in a predetermined order to generate the pattern of the two or more colored regions which are repeated along a length of the core-shell fiber. FIG. 3 illustrates an overview of the core-shell electrospinning apparatus. Two syringes 401a, 401b and two syringe pumps 402a, 402b are used with the double-syringe nozzle 403. The at least one core resin solution and at least one shell resin solution are provided into the double-syringe nozzle 403, which can be a coaxial spinneret. One syringe 401a connects to a core extruding portion 403a of the double-syringe nozzle 403. The other syringe 401b connects to a shell extruding portion 403b of the double-syringe nozzle 403. The syringes are in fluid communication with reservoirs (not shown in FIG. 3) containing the respective at least one core resin solution and at least one shell resin solution. The reservoirs can be configured to supply different resin solutions in predetermined orders to the syringes, such that the extruded core-shell fiber includes the information encoding patterns on the core portion and/or the shell portion. The electrospinning can be performed under an electric field 404 using a high-voltage power supply, such as a DC power supply of about 10 kV to about 30 kV. The core-shell fiber 405 can be ejected from the spinneret and collected on the collector 406 as shown in FIG. 3. The core-shell fiber 405 can be cut and/or separated into a plurality of barcode segments and the plurality of barcode segments can be dispersed in a binder to form the paint.

In electrospinning processes, where the core resin solution or the shell resin solution includes an organic resin, the resin may be supplied in the form of a resin solution. The resin solution may include a solvent such as formic acid, concentrated sulfuric acid, hexafluoroisopropanol, acetic acid, or a mixture of formic acid and chloroform. The shell resin solution can include a solvent that has good affinity to the solvent for the core resin solution, so as to avoid evaporation of the solvent in the core resin solution during electrospinning, to fabricate a stable core-shell fibers. It will be appreciated that any polymeric materials can be used to produce the core-shell fiber or solid-state barcode as long as the material can remain stable when exposed to heat generated during the extrusion process, such as the electrospinning process. Suitable materials include those as described above for the core resin solution and the shell resin solution. In order to vary the core/shell thickness ratio of the core-shell fiber, ejection speeds of the shell resin solution and of the core resin solution, types of resins in the shell resin solution and the core resin solution, molecular weight of resins in the shell resin solution and the core resin solution, and/or concentrations of resins in the shell resin solution and the core resin solution, can be varied until a desired core/shell thickness ratio is achieved. In some examples, the shell portion is made thinner relative to the core portion so that optical transparency can be achieved to allow interrogation of the core portion by optical signals.

The fabricated core-shell fibers have a structure in which information encoded pattern is repeated continuously along a certain length. Thus, for example, after winding the fibers on a reel in the form of a continuous fiber, it is possible to obtain solid-state barcodes having intended barcode information through an appropriate cutting process. Solid-state barcodes can be created to have information encoded patterns by creating a driving program (or a software program configured to instruct extrusion devices) for the colored resin solutions needed to form the barcodes.

The solid-state barcode can be used for all goods or products managed by using barcodes. Furthermore, with the improved traceability realized by solid-state barcodes, they can also be suitably applied to copy management, recycling, processed food, and any other industry where traceability or coded information would improve product use and function.

Three-dimensional solid-state barcodes can be used and serve as an alternative to the conventional printed barcodes. Through the techniques and manufacturing procedures described herein, it is possible to provide barcodes that can be applied by means of spraying a paint containing the solid-state barcodes.

EXAMPLES

Example 1

Solid-State Barcodes Having Information Encoded Pattern on Core Portion

A solid-state barcode may include a core portion and a shell portion surrounding the core portion. The diameter of the solid-state barcode can be 8 micrometers, and the length of the solid-state barcode can be 80 micrometers.

The core portion may be formed of different colored polyamide resins such as Nylon 6. The different colored polyamide resins may include a black colored core resin that includes a black dye, and a white colored core resin that includes a white dye. The different colored core resins can form a pattern of black colored regions and white colored regions. The black colored dye and the white colored dye may be acidic dyes such as azo dyes. The acidic dyes can interact with the molecular chains of the organic resin (polyamide) to achieve uniform coloration.

The shell portion may form a protective shell around the core portion, and can be formed of any polyester resin that is transparent to visible light such as polyethylene terephthalate. Therefore, optical signals in the visible light spectrum can pass through the shell portion to interrogate the core portion when reading the solid-state barcode.

The pattern of different colored regions on the core portion can be configured to encode information using symbology encoding methods.

Example 2

Solid-State Barcodes Having Information Encoded Pattern on Core Portion and Shell Portion A solid-state barcode may include a core portion and a shell portion surrounding the core portion. The diameter of the solid-state barcode can be 10 micrometers, and the length of the solid-state barcode can be 100 micrometers.

The core portion may be formed of different colored polyamide resins such as Nylon 66. The different colored polyamide resins may include a red colored core resin that includes a red dye, a blue colored core resin that includes a blue dye, and a green colored core resin that includes a green dye. The different colored core resins may form a pattern of red colored regions, blue colored regions and green colored regions. The different colored dyes can be acidic dyes such as anthrachinon dyes. The acidic dyes can interact with the molecular chains of the organic resin (polyamide) to achieve uniform coloration.

The shell portion may form a protective shell around the core portion, and can be formed of any polymeric resin that is transparent to visible light such as polyvinyl alcohol. The polymeric resin of the shell portion may include a shell resin with UV marker such as dimethyl phthalate, and a shell resin with IR marker such as an aldehyde, arranged to form a pattern of different regions. The shell resin with the IR marker and the shell resin with the UV marker can form a shell portion that is optically transparent to light in the visible spectrum.

The shell portion, which may be optically transparent to light in the visible spectrum, can allow for optical signals in the visible light spectrum to interrogate the core portion when reading the solid-state barcode.

The use of IR markers and UV markers to form the pattern in the shell portion can avoid interference of information encoding patterns in the core portion and in the shell portion, as the optical signals for interrogating the shell portion (optical signals with wavelengths in the UV spectrum and/or IR spectrum) is different from the optical signals for interrogating the core portion (optical signals with wavelengths in the visible light spectrum).

Example 3

Solid-State Barcodes Having Information Encoded Pattern on Shell Portion

A solid-state barcode may include a core portion and a shell portion surrounding the core portion. The diameter of the solid-state barcode can be 7 micrometers, and the length of the solid-state barcode can be 70 micrometers.

The core portion may be formed of a single colored polyamide resin such as Nylon 6. The single colored polyamide resin may include a core resin that contains a brown dye. The brown dye can be an acidic dye, such as an azo dye. The acidic dye can interact with the molecular chains of the organic resin (polyamide) to achieve uniform coloration.

The shell portion may form a protective shell around the core portion, and can be formed of any polymeric resin that is transparent to visible light such as polylactic acid. The polymeric resin of the shell portion may include a shell resin with UV marker such as bis(2-ethylhexyl)adipate, and a shell resin with IR marker such as a quantum dot, arranged to form a pattern of different regions. The shell resin with the IR marker and the shell resin with the UV marker can form a shell portion that is optically transparent to light in the visible spectrum. The pattern can become visible when interrogated by optical signals in the UV spectrum and/or IR spectrum (depending on the type of marker).

Under visible light, the pattern of different regions can appear invisible, thus preventing unauthorized users from reproducing or reading the barcode.

Example 4

Methods of Manufacturing Solid-State Barcodes

The solid-state barcode from Example 1 can be manufactured using the extrusion apparatus as illustrated in FIG. 3.

The black colored core resin and the white colored core resin may be provided in solution form by providing the different resins in a solvent such as acetic acid. The black colored core resin solution and the white colored core resin solution can be provided in reservoirs (not shown in FIG. 3) that are in fluid communication with the syringe 401a that connects to a core extruding portion 403a of the double-syringe nozzle 403. The reservoirs can be configured to supply the different colored core resin solutions to the syringe 401a in a predetermined order so that the pattern of black colored regions and white colored regions can be formed in the core portion of the extruded core-shell fiber.

The shell resin solution may also be provided in solution form using acetic acid as the solvent. The shell resin solution can be provided in another reservoir that is in fluid communication with the syringe 401b that connects to a shell extruding portion 403b of the double-syringe nozzle 403. The reservoir supplies the shell resin solution to the syringe 401b.

The syringes 401a, 401b supply the core resin solution(s) and the shell resin solution to the double-syringe nozzle 403 which then extrudes the different resin solutions in a coaxial manner to form a continuous core-shell fiber 405 having a core-shell structure. The extruding may be performed under an electric field provided by a DC power supply of about 20 kV. The extruded core-shell fiber 405 can be collected on the collector 406 as shown in FIG. 3. The core-shell fiber 405 can be cut and/or separated into a plurality of barcode segments to form a plurality of solid-state barcodes.

The method described in this Example can also be easily adapted to manufacture the solid-state barcodes of Examples 2 and 3, such as by varying the supply of the various resin solutions to the syringes from the reservoirs, adapting the solvents to suit the different resins, and/or adjusting the electric field strength required for the electrospinning process.

Example 5

Paints with Solid-State Barcodes

The solid-state barcodes of any one of Examples 1 to 3 can be incorporated into a binder to form a paint. The binder can be any binder that is transparent to visible light such as an organic resin, a water-soluble resin, a thermosetting resin or a UV-curing resin.

The paint can be applied onto an object such as a housing of a lithium-ion battery of a hybrid electric vehicle. The paint can be applied by spraying. The paint, when applied onto the object, may form a film or coating that includes the solid-state barcodes, thus labelling the object with information encoded in the barcodes. The information can be the part identification number, date of manufacture, material composition, and operating parameters such as voltage, temperature and current.

Example 6

Reading Information Encoded in Solid-State Barcodes

To read the solid-state barcodes that are on the surface of an object (such as the labelled battery from Example 5), a scanner can be used to generate an optical signal which interrogates the barcodes. Depending on the type of barcodes, the scanner can be configured to generate optical signals having wavelengths suitable for generating images of the information encoding patterns on the core portion and/or the shell portion of the barcodes.

Using the barcodes of Example 2 as an example, the optical signal can include light from the visible spectrum, UV spectrum and the IR spectrum to interrogate the pattern formed by the red colored regions, blue colored regions and green colored regions on the core portion, and the pattern formed by the IR marker and the UV marker on the shell portion. Likewise, for the barcodes of Example 1, the optical signal can be visible light that interrogates the pattern formed by the black colored regions and white colored regions on the core portion. Also for the barcodes of Example 3, the optical signal can be UV and IR light that interrogates the pattern of different regions formed by the UV marker and the IR marker.

The image of the pattern (on the core portion and/or the shell portion) can be acquired, for example using a detector such as a CMOS sensor or a CCD, and analyzed by image processing software to read the encoded information.

The solid-state barcodes as described in the Examples can be easily applied onto objects, and the methods of application (for example, spraying) can be less complex than printing methods such as ink jet printing which requires programming to form specific barcodes or patterns on the objects, and does not expose the object to high temperatures such as in laser printing. The solid-state barcodes as described in the Examples can have sizes in the micrometer range, which can allow for small amounts of paint to label the objects. As the barcodes are applied into the components themselves, traceability of the component can be facilitated, for example, during recycling efforts or defective product recall efforts.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, and so on" is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on" is used, in general, such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A solid-state barcode, comprising:
   a core portion;
   a shell portion that substantially surrounds the core portion; and
   a pattern of two or more regions included in the core portion or in a combination of the core portion and the shell portion,
   wherein the pattern of two or more regions is configured to encode information, and
   wherein the pattern of two or more regions included in the core portion has colors in a visible light spectrum, and the pattern of two or more regions included in the shell portion has colors in an infra-red spectrum, ultra-violet spectrum, or both.

2. The solid-state barcode of claim 1, wherein the solid-state barcode has a diameter equal to or less than about 10 micrometers.

3. The solid-state barcode of claim 1, wherein the solid-state barcode has a length equal to or less than about 100 micrometers.

4. The solid-state barcode of claim 1, wherein at least two regions in the pattern of two or more regions are different in color.

5. The solid-state barcode of claim 1, wherein the shell portion is optically transparent to light in the visible light spectrum.

6. A paint, comprising:
   at least one optically transparent binder; and
   at least one solid-state barcode dispersed in the at least one optically transparent binder, the at least one solid-state barcode comprising:
   a core portion; and
   a shell portion that substantially surrounds the core portion,
   wherein both of the core portion and the shell portion comprise a pattern of two or more regions, and wherein the pattern of two or more regions is configured to encode information.

7. The paint of claim 6, wherein the pattern of two or more regions has colors in a visible light spectrum, infra-red spectrum, ultra-violet spectrum, or any combination thereof.

8. The paint of claim 6, wherein at least two regions in the pattern of two or more regions are different in color.

9. The paint of claim 6, wherein the shell portion is optically transparent to light in a visible light spectrum.

10. The paint of claim 6, wherein the at least one optically transparent binder comprises organic resin, water-soluble resin, thermosetting resin, UV-curing resin, or any combination thereof.

11. The paint of claim 6, wherein the paint is configured to be applied by brushing, spraying, dipping, or any combination thereof.

12. The paint of claim 6, wherein the pattern of two or more regions in the core portion has colors in a visible light spectrum, and wherein the pattern of two or more regions in the shell portion has colors in an infra-red spectrum, an ultra-violet spectrum, or both.

13. A method to manufacture one or more solid-state barcodes, the method comprising:
   extruding at least one core resin solution and at least one shell resin solution to form one or more core-shell fibers, the one or more core-shell fibers comprising a core portion and a shell portion that substantially surrounds the core portion,
   wherein both of the core portion and the shell portion comprise a pattern of two or more regions, and wherein the pattern of two or more regions is configured to encode information.

14. The method of claim 13, wherein extruding the at least one core resin solution comprises extruding two or more core resin solutions, and wherein extruding the two or more core resin solutions includes extruding in a particular order to generate the pattern of two or more regions on the core portion.

15. The method of claim 13, wherein extruding the at least one shell resin solution comprises extruding two or more shell resin solutions, and wherein extruding the two or more shell resin solutions includes extruding in a particular order to generate the pattern of two or more regions on the shell portion.

16. The method of claim 13, wherein the pattern or two or more regions is repeated along a length of the one or more core-shell fibers.

17. The method of claim 13, further comprising separating the one or more core-shell fibers into a plurality of barcode segments, wherein each segment comprises at least one pattern.

18. The method of claim 13, wherein the at least one core resin solution, the at least one shell resin solution, or both, comprise at least one organic resin material.

19. The method of claim 18, wherein the at least one core resin solution, the at least one shell resin solution, or both, further comprise at least one colorant having a color in a visible light spectrum.

20. The method of claim 19, wherein the at least one colorant includes an acidic dye.

21. The method of claim 18, wherein the at least one core resin solution, the at least one shell resin solution, or both, further comprise at least one marker having a characteristic absorption band in an infra-red spectrum, an ultra-violet spectrum, or both.

22. The method of claim 13, further comprising encoding information in the pattern of two or more regions.

23. The method of claim 13, wherein the pattern of two or more regions in the core portion has colors in a visible light spectrum, and wherein the pattern of two or more regions in the shell portion has colors in an infra-red spectrum, an ultra-violet spectrum, or both.

24. A method to read information encoded in one or more solid-state bar codes, the method comprising:
   providing a scanner configured to generate at least one optical signal;

interrogating the one or more solid-state barcodes with the at least one optical signal, wherein each solid-state barcode comprises:
a core portion; and
a shell portion that substantially surrounds the core portion,
wherein both of the core portion and the shell portion comprise a pattern of two or more regions, and wherein the pattern of two or more regions is configured to encode the information;
acquiring an image of the pattern of two or more regions from the at least one optical signal, which is returned from the one or more solid-state barcodes; and
decoding the information that is encoded in the pattern of two or more regions using an image processing software.

25. The method of claim 24, wherein the pattern of two or more regions in the core portion has colors in a visible light spectrum, and wherein the pattern of two or more regions in the shell portion has colors in an infra-red spectrum, an ultra-violet spectrum, or both.

26. The method of claim 24, wherein the at least one optical signal has a wavelength in a visible light spectrum, an infra-red spectrum, an ultra-violet spectrum any combination thereof.

27. The method of claim 24, wherein the pattern of two or more regions has colors in a visible light spectrum, an infra-red spectrum, an ultra-violet spectrum, or any combination thereof.

* * * * *

UNITED STATES PATENT AND TRADEMARK OFFICE
CERTIFICATE OF CORRECTION

PATENT NO. : 9,734,444 B2  
APPLICATION NO. : 14/732424  
DATED : August 15, 2017  
INVENTOR(S) : Fujimoto Page 1 of 1

It is certified that error appears in the above-identified patent and that said Letters Patent is hereby corrected as shown below:

On the Title Page

In Item (71), under "Applicant", in Column 1, Lines 1-2, delete "Empire Technology Development LLC, Wilmington (DE)" and insert -- Empire Technology Development LLC, Wilmington, DE (US) --, therefor.

In the Specification

In Column 14, Line 14, delete "recitation no" and insert -- recitation, no --, therefor.

In the Claims

In Column 16, Line 36, in Claim 16, delete "pattern or" and insert -- pattern of --, therefor.

In Column 17, Line 24, in Claim 26, delete "spectrum any" and insert -- spectrum, or any --, therefor.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*